(12) United States Patent
Murphy (10) Patent No.: US 9,915,445 B1
(45) Date of Patent: Mar. 13, 2018

(54) PARABOLIC TROUGH MODULES (71) Applicant: James M. Murphy, Bastrop, LA (US)

(72) Inventor: James M. Murphy, Bastrop, LA (US)

(*) Notice: Subject to any disclaimer, the term of this patent is extended or adjusted under 35 U.S.C. 154(b) by 452 days.

(21) Appl. No.: 14/601,617

(22) Filed: Jan. 21, 2015

(51) Int. Cl.
*F24J 2/14* (2006.01)
*F24J 2/12* (2006.01)
*F24J 2/52* (2006.01)

(52) U.S. Cl.
CPC .. *F24J 2/12* (2013.01); *F24J 2/52* (2013.01)

(58) Field of Classification Search
CPC ....... F24J 2/12; F24J 2/52; G02B 5/10; H01L 31/054; H01L 31/0543; H01L 31/0547; H02S 40/22; H02S 40/44
USPC ................ 126/690, 694, 696; 136/246–248; 359/871
See application file for complete search history.

(56) References Cited

U.S. PATENT DOCUMENTS

| | | | |
|---|---|---|---|
| 4,098,264 A * | 7/1978 | Brokaw | F24J 2/14 126/578 |
| 4,158,356 A * | 6/1979 | Wininger | F24J 2/14 126/570 |
| 4,236,399 A | 12/1980 | Williams et al. | |
| 4,285,330 A | 8/1981 | Shook | |
| 4,421,104 A | 12/1983 | Adcock | |
| 4,611,575 A * | 9/1986 | Powell | F24J 2/145 126/570 |
| 4,667,653 A | 5/1987 | Cornell | |
| 4,713,397 A * | 12/1987 | Hirama | A61K 8/355 514/690 |
| 5,071,243 A * | 12/1991 | Bronstein | F24J 2/145 126/652 |
| 8,353,285 B2 | 1/2013 | Litwin | |
| 8,607,782 B2 * | 12/2013 | Bronstein | F24J 2/145 126/684 |
| 9,349,899 B2 * | 5/2016 | Schwartz | F24J 2/38 |
| 2008/0083405 A1 * | 4/2008 | Kimura | F24J 2/145 126/690 |
| 2008/0247069 A1 * | 10/2008 | Bronstein | F24J 2/145 359/871 |
| 2010/0206379 A1 | 8/2010 | Littau et al. | |
| 2010/0326424 A1 | 12/2010 | Bennett | |
| 2012/0017887 A1 | 1/2012 | Ahnert et al. | |
| 2014/0034042 A1 * | 2/2014 | Marcotte | F24J 2/1057 126/600 |
| 2014/0270740 A1 | 9/2014 | O'Rourke et al. | |

* cited by examiner

Primary Examiner — William V Gilbert
(74) Attorney, Agent, or Firm — R. Keith Harrison (57) ABSTRACT

Parabolic trough modules include a generally elongated parabolic trough including a pair of spaced-apart trough end walls and a trough panel extending between the trough end walls. The trough panel is generally semi-circular in cross-section and has a concave light reflective surface.

16 Claims, 8 Drawing Sheets

PARABOLIC TROUGH MODULES

FIELD

Illustrative embodiments of the disclosure generally relate to parabolic troughs which can be used to heat a fluid flowing through an absorber or conduit. More particularly, illustrative embodiments of the disclosure generally relate to parabolic trough modules one or more of which can support an absorber or conduit on a roof or other structure or surface to heat a fluid flowing through the conduit using solar energy.

SUMMARY

Illustrative embodiments of the disclosure are generally directed to parabolic trough modules one or more of which can support a conduit on a roof or other structure or surface to heat a fluid flowing through the conduit using solar energy. In some embodiments, the parabolic trough modules may include a generally elongated parabolic trough including a pair of spaced-apart trough end walls and a trough panel extending between the trough end walls. The trough panel is generally semi-circular in cross-section and has a concave light reflective surface. A generally elongated module anchor flange having a middle flange portion may be carried by each of the trough end walls. A pair of anchor tabs may extend from the middle flange portion beyond respective sides of each corresponding one of each of the trough end walls.

In some embodiments, the parabolic trough modules may include a generally elongated parabolic trough including a pair of spaced-apart trough end walls and a trough panel extending between the trough end walls. The trough panel is generally semi-circular in cross-section and may have a concave light reflective surface, a cross-sectional radial curvature of less than about 180 degrees and a trough width:trough depth ratio of about 4:1.

In some embodiments, the parabolic trough modules may include a generally elongated parabolic trough having a pair of spaced-apart trough end walls, at least one conduit securing device carried by each of the trough end walls and a trough panel extending between the trough end walls. The trough panel is generally semi-circular in cross-section and has a concave light reflective surface. A generally elongated module anchor flange having a middle flange portion is carried by each of the trough end walls, and a pair of anchor tabs extends from the middle flange portion beyond respective sides of each corresponding one of each of the trough end walls. A pair of module legs may be detachably carried by the pair of anchor tabs, respectively. Each of the pair of module legs may include an insertion segment detachably engaging a corresponding one of the pair of anchor tabs, a main leg segment extending from the insertion segment in generally perpendicular relationship thereto and a foot extending from the main leg segment in generally perpendicular relationship thereto.

BRIEF DESCRIPTION OF THE DRAWINGS

Illustrative embodiments of the disclosure will now be described by way of example, with reference to the accompanying drawings, wherein.

DETAILED DESCRIPTION

The following detailed description is merely exemplary in nature and is not intended to limit the described embodiments or the application and uses of the described embodiment. As used herein, the word "exemplary" or "illustrative" means "serving as an example, instance, or illustration". Any implementation described herein as "exemplary", or "illustrative" is not necessarily to be construed as preferred or advantageous over other implementations. All of the implementations described below are exemplary implementations provided to enable users as skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front", "rear", "upper" and "lower" used herein are intended to describe application of the sleeve garment assemblies in some but not all applications. Thus, such relative terms are intended to be used for descriptive purposes only and are not intended to limit the scope of the appended claims.

Referring initially to FIGS. 1-6 and 8 of the drawings, an illustrative embodiment of the parabolic trough modules is generally indicated by reference numeral 1. Unless otherwise noted, the various components of the parabolic trough module 1 may be fabricated of aluminum sheet metal components and/or other metallic and/or nonmetallic components which are known by those skilled in the art and consistent with the functional requirements of the parabolic trough module 1. The components may be fabricated separately and attached to each other using mechanical fasteners, welding and/or other fabrication techniques and methods or may be fabricated in one piece using casting, molding and/or other techniques and methods known by those skilled in the art.

Figure 3:
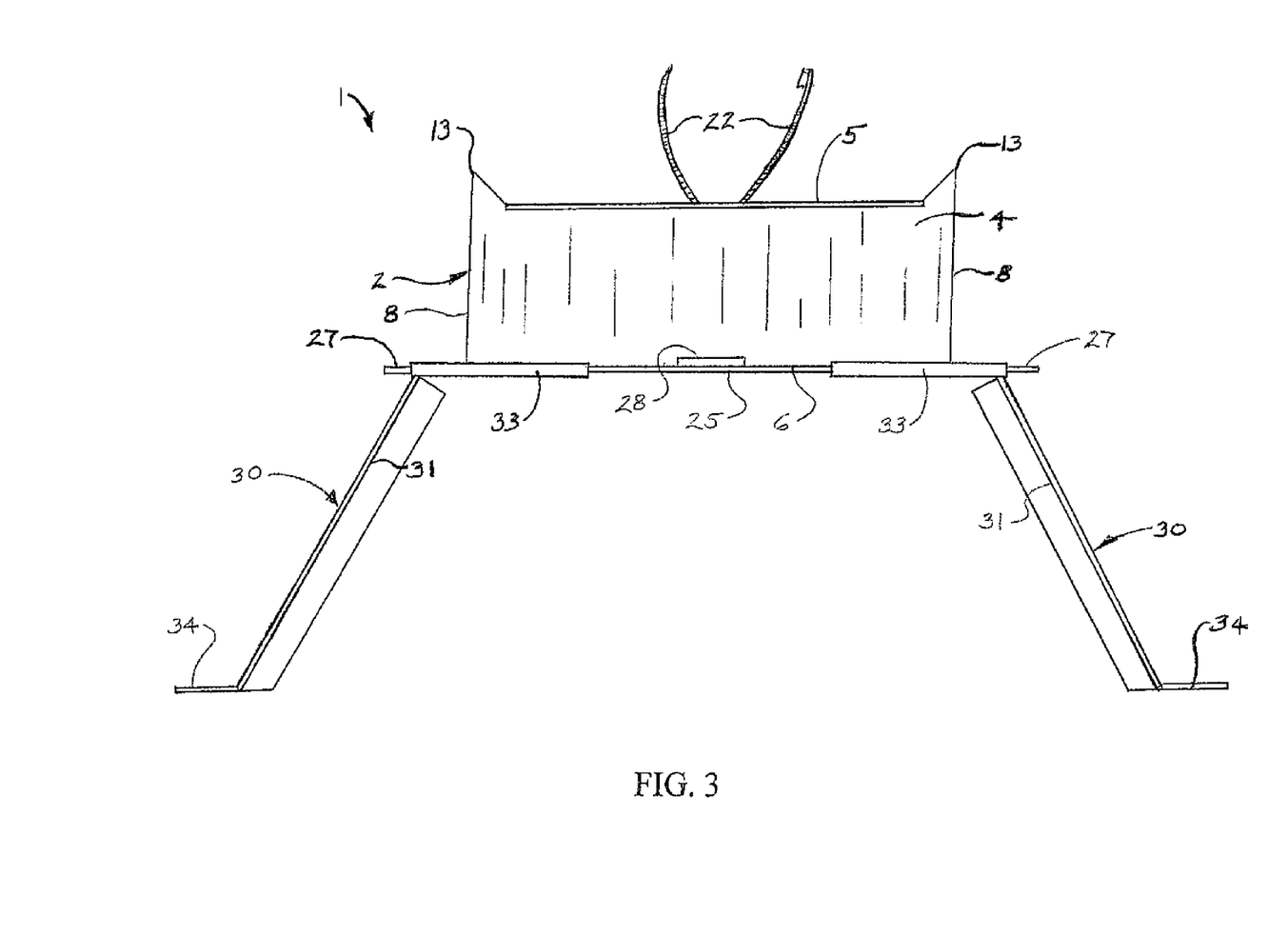
FIG. 3 is an end view of an illustrative embodiment of the parabolic trough modules.
Figure 4:
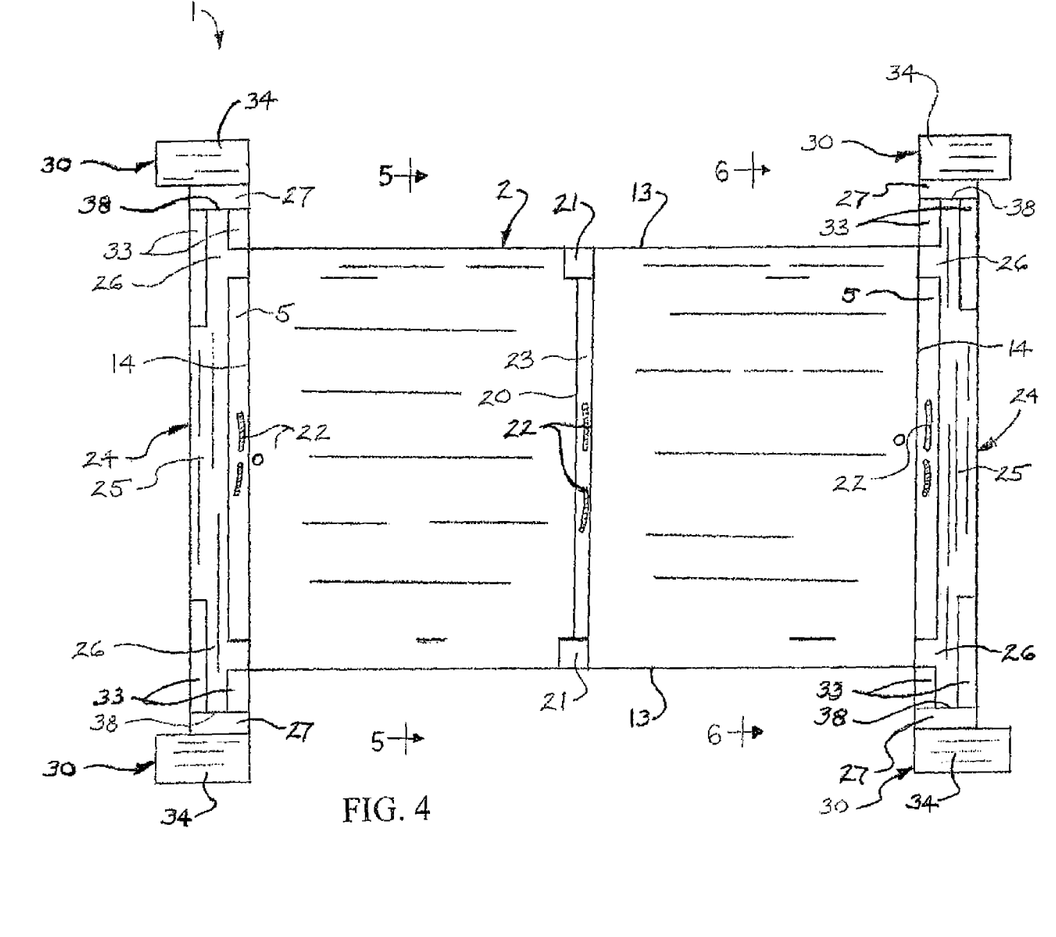
FIG. 4 is a top view of an illustrative embodiment of the parabolic trough modules.

The parabolic trough module 1 may include a parabolic trough 2 which may be generally elongated and rectangular in shape. The parabolic trough 2 may include a pair of generally parallel, spaced-apart trough end walls 4. Each trough end wall 4 may have a generally flat or planar conduit support surface 5, the purpose of which will be hereinafter described. As illustrated in FIG. 3, each trough end wall 4 may have a lower end wall edge 6 which is generally parallel to and opposite the conduit support surface 5.

Figure 5:
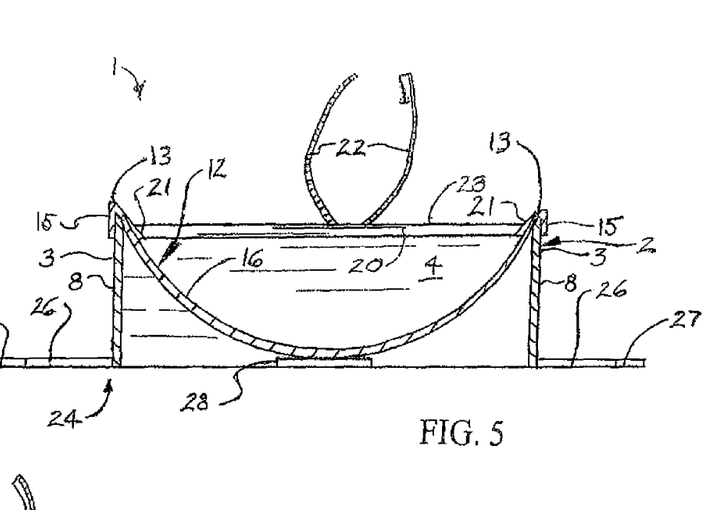
FIG. 5 is a cross-sectional view, taken along section lines 5-5 in FIG. 4.
Figure 6:
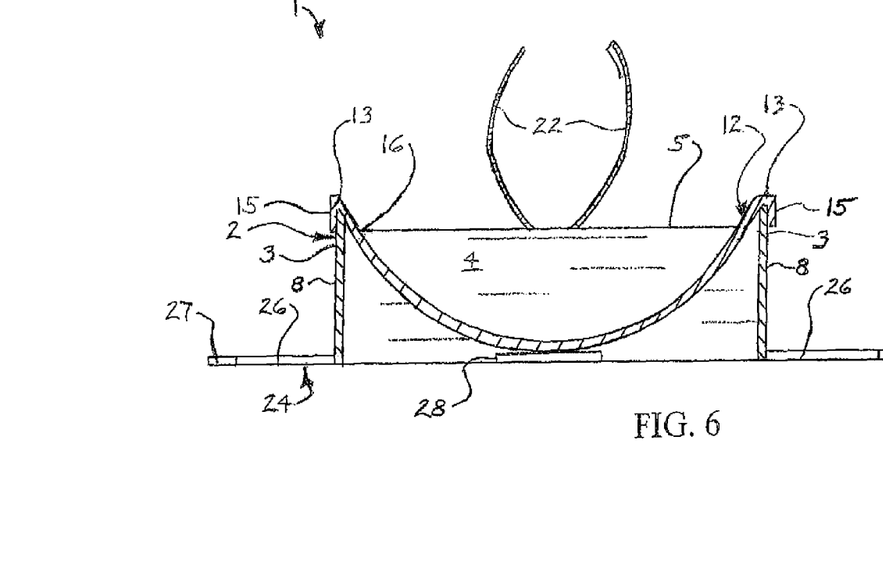
FIG. 6 is a cross-sectional view, taken along section lines 6-6 in FIG. 4.

A trough panel 12 may extend between the trough end walls 4 of the parabolic trough 2. As illustrated in FIGS. 5 and 6, the trough panel 12 may be generally semi-circular in cross-section and may have a concave light reflective surface 16. The trough panel 12 may have a pair of generally straight, elongated, parallel, spaced-apart trough panel side edges 13 and a pair of generally curved, parallel, spaced-apart trough panel end edges 14 (FIGS. 1 and 2) which extend between the trough panel side edges 13. A pair of panel side flanges 15 may extend from the opposite panel side edges 13 of the trough panel 12, as further illustrated in FIGS. 5 and 6. The light reflective surface 16 of the trough panel 12 may include polished, lightweight aluminum sheet metal which is lightly polished and coated with a clear acrylic enamel paint sealer known by those skilled in the art. A pair of spaced-apart trough legs 8 may extend downwardly from each panel side flange 15 of the parabolic trough 2.

At least one conduit support member 20 having a conduit support surface 23 may extend across the trough panel 12 over the light reflective surface 16. The conduit support member 20 may be disposed about midway or equidistant between the trough end walls 4 and may be disposed in parallel, spaced-apart relationship to the conduit support surfaces 5 of the respective trough end walls 4. In some embodiments, the conduit support member 20 may be attached to the trough panel 12 through a pair of support member end flanges 21. In other embodiments, the conduit support member 20 may be welded, bolted and/or otherwise directly or indirectly attached to the trough panel 12 or may be fabricated in one piece with the trough panel 12 according to the knowledge of those skilled in the art.

At least one conduit securing device 22 may be provided on the conduit support surface 23 of the conduit support member 20 and on the conduit support surface 5 of each trough end wall 4 of the parabolic trough 2. Each conduit securing device 22 may include a twist tie, clamp, bracket and/or any other device or mechanism which is suitable for the purpose of securing a fluid-carrying absorber or conduit 48 (FIG. 8) on the respective conduit support member 20 and trough end walls 4 of the parabolic trough 2 for purposes which will be hereinafter described.

A module anchor flange 24 may extend along each trough end wall 4 of the parabolic trough 2 in transverse relationship to the longitudinal axis of the parabolic trough 2. The module anchor flange 24 may include a middle flange portion 25 which may be fastened, welded and/or otherwise secured to the trough end wall 4 according to the knowledge of those skilled in the art. The middle flange portion 25 of the module anchor flange 24 may extend along the lower end wall edge 6 of the trough end wall 4. A pair of anchor tabs 26 may extend in opposite directions from the middle flange portion 25. The anchor tabs 26 may protrude beyond respective sides of each trough end wall 4 at each corresponding end of the parabolic trough 2. An anchor tab end 27 may terminate each anchor tab 26. A tab bend line 38 may demarcate the anchor tab end 27 from the anchor tab 26. As particularly illustrated in FIGS. 1 and 2, the plane of the module anchor flange 24 may be disposed in generally perpendicular relationship to the plane of each corresponding trough end wall 4. In some embodiments, at least one reflector 28 may be provided on the middle flange portion 25 of each module anchor flange 24. As illustrated in FIG. 3, the reflector 28 may be disposed in substantial vertical registration or alignment with the conduit securing device 22 on the conduit support surface 5 of the corresponding trough end wall 4. The purpose of each module anchor flange 24 will be hereinafter described.

Figure 1:
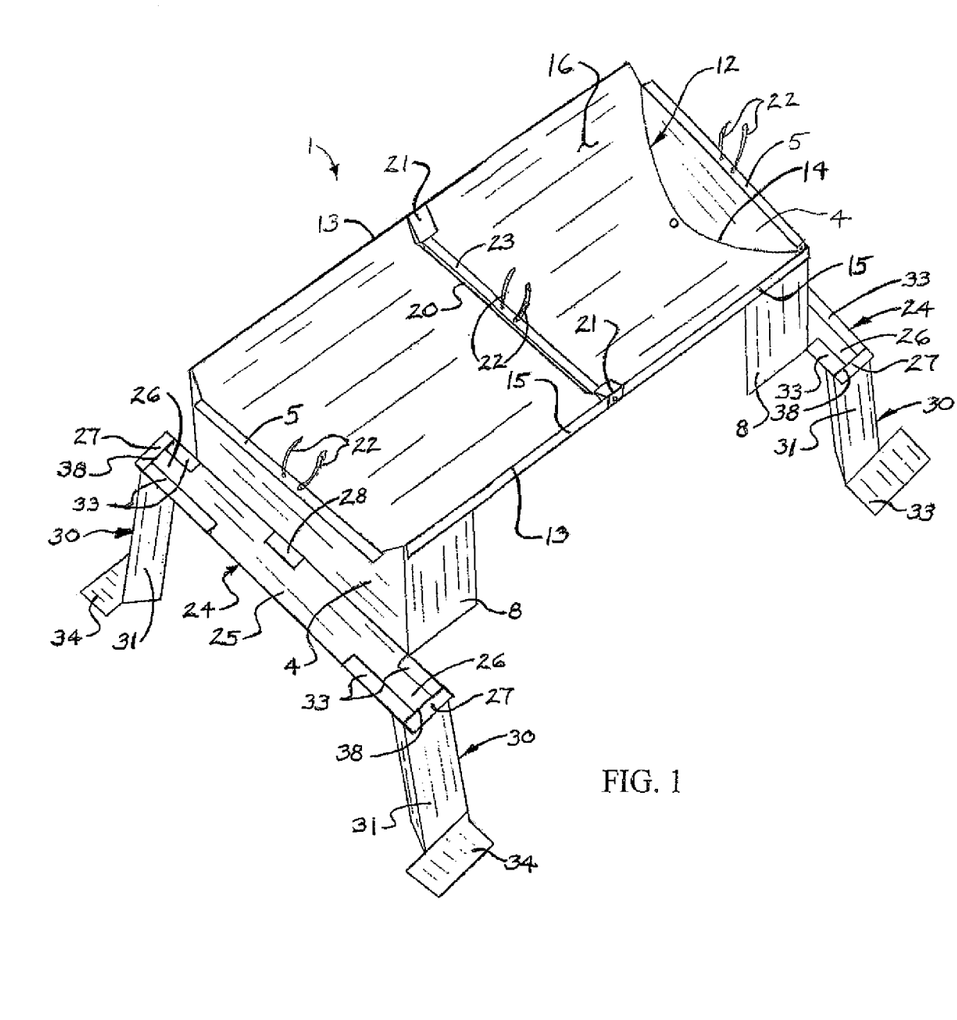
FIG. 1 is a perspective view of an illustrative embodiment of the parabolic trough modules.
Figure 2:
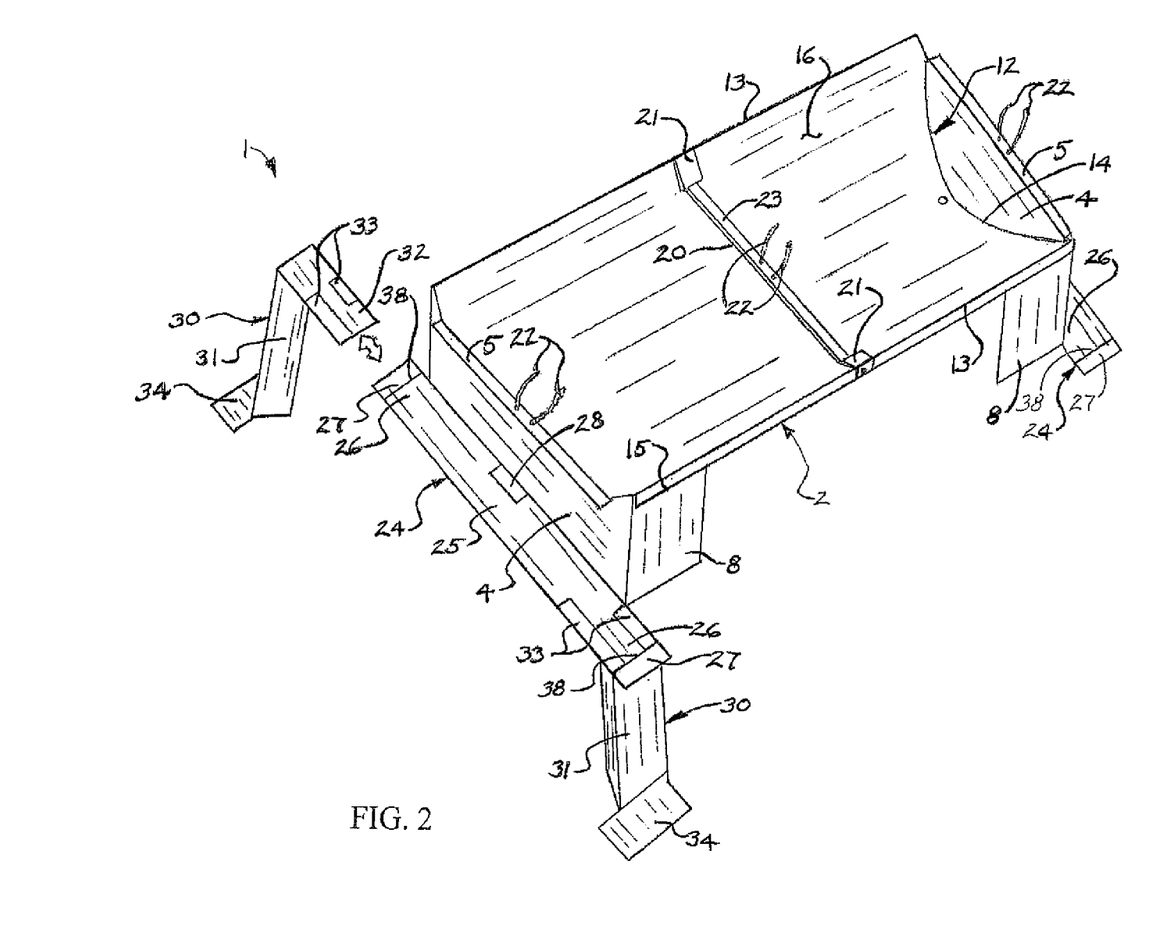
FIG. 2 is a partially exploded perspective view of an illustrative embodiment of the parabolic trough modules, more particularly illustrating typical removable attachment of a module leg to the parabolic trough module in some applications.

As illustrated in FIGS. 1 and 2, in some embodiments, a pair of module legs 30 may be detachably attached to each module anchor flange 24. As illustrated in FIG. 2, each module leg 30 may include a main leg segment 31. An insertion segment 32 may extend from an upper end of each main leg segment 31 in generally perpendicular relationship thereto. A foot 34 may extend from a lower end of each main leg segment 31 in generally perpendicular relationship thereto. At least one leg securing flange 33 may be provided on the insertion segment 32. Accordingly, each module leg 30 may be detachably attached to the module anchor flange 24 by inserting the anchor tab 26 between the insertion segment 32 and the leg securing flanges 33. The anchor tab end 27 may be bended along the tab bend line 38 to prevent the anchor tab 26 from inadvertently slipping through the leg securing flanges 33. Conversely, each module leg 30 can be selectively removed or detached from the module anchor flange 24 by bending the anchor tab 26 at the tab bend line 38 to a straight orientation and sliding the insertion segment 32 of the module leg 30 in the direction away from the module anchor flange 24 until the anchor tab 26 is removed from between the insertion segment 32 and the leg securing flanges 33.

Figure 7:
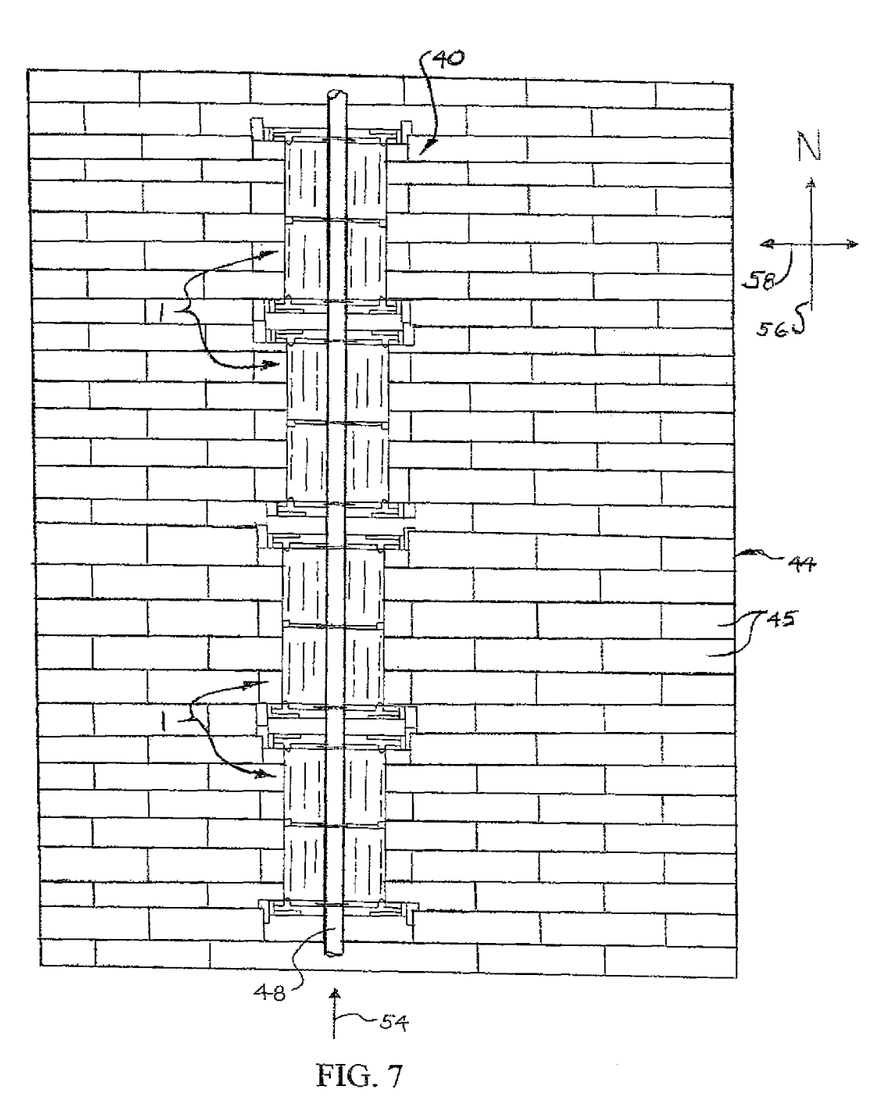
FIG. 7 is a top view of a roof on a structure, with multiple parabolic trough modules placed on the roof end-to-end and a conduit supported on the parabolic trough modules and a fluid flowing through the conduit for heating of the fluid with solar energy in typical application of the parabolic trough modules.
Figure 8:
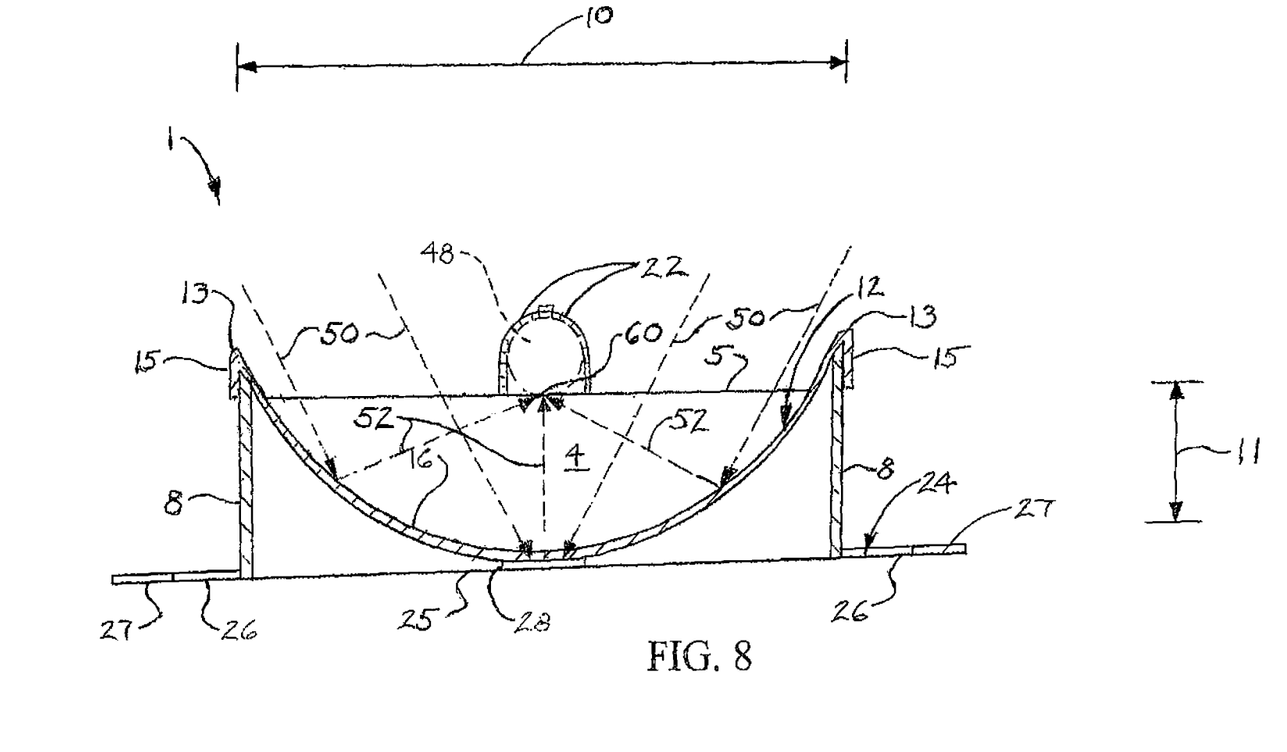
FIG. 8 is a cross-sectional view of an illustrative parabolic trough module, taken along section lines 6-6 FIG. 4, more particularly illustrating incident solar rays striking the parabolic trough and reflective solar rays reflected from the parabolic trough and concentrated on a solar energy focal point on a conduit (illustrated in phantom) supported on the trough module to heat a fluid as it flows through the conduit.

Referring next to FIGS. 7 and 8 of the drawings, in typical application, multiple parabolic trough modules 1 may be placed in end-to-end relationship to each other on the roof 44 of a structure to form a parabolic trough assembly 40. A conduit or absorber 48 which conveys a fluid 54 to be heated is placed lengthwise across the conduit support surfaces 5 on the respective trough end walls 4 and the conduit support surfaces 23 on the conduit support members 20 of the parabolic trough modules 1. The absorber 48 may be secured to the parabolic trough modules 1 by fastening the conduit securing devices 22. As illustrated in FIG. 8, the absorber 48 may be positioned directly above the reflectors 28 on the respective module anchor flanges 24 of each parabolic trough module 1. In some applications, the longitudinal axes of the parabolic trough modules 1 and the absorber 48 may be oriented along the North-South axis 56, as illustrated in FIG. 7. In other applications, the parabolic trough modules 1 and the absorber 48 may be oriented along an East-West axis 58 or other directional axis. Orienting the parabolic trough modules 1 and the absorber 48 along the North-South axis 56 may facilitate acquisition of a large quantity of solar energy for a relatively short duration during solar mid-day. Conversely, orientating the parabolic trough modules 1 and the absorber 48 along the East-West axis 58 may facilitate acquisition of a smaller quantity of heat from sunrise to sunset. Orientation of the parabolic trough modules 1 along the East-West axis 58 may generate heat in excess of 150 degrees Fahrenheit at the surface of the absorber 48. Orientation of the parabolic trough modules 1 along the North-South axis 56 may generate heat of up to 230 degrees Fahrenheit. The absorber 48 may include a tube, pipe, hose or other conduit which is suitable for conveying a fluid and may be fabricated of rubber, plastic or other heat-absorbing material. The absorber 48 may be installed by a user of the parabolic trough modules 1 by fastening the absorber 48 it to the trough end walls 4 and the conduit support member 20 using the conduit securing devices 22. In some embodiments, the absorber 48 be ½ inch inside diameter, dark in color, and able to withstand at least 250 degrees Fahrenheit of heat.

As illustrated in FIG. 8, during daylight, incident solar rays 50 strike the concave light reflective surface 16 on the trough panel 12. Reflected solar rays 52 are reflected from the light reflective surface 16 to a solar energy focal point 60 on the absorber 48. Incident solar rays 50 may also strike the reflector 28 on the main flange portion 25 of each module anchor flange 24, and reflected solar rays 52 may reflect from the reflector 28 to the solar energy focal point 60. Accordingly, the light reflective surface 16 and the reflectors 28 concentrate the solar energy at the solar energy focal point 60 to heat the fluid 54 flowing through the absorber 48. The light reflective surface 16 of the trough panel 12 may not undergo a significant increase in temperature, whereas the surface of the absorber 48 may undergo a significant increase in temperature.

As further illustrated in FIG. 8, in some embodiments, the cross-sectional radial curvature of the trough panel 12 may be less than about 180 degrees. The parabolic trough 2 may have a trough width 10 which corresponds to the distance between the ends of each trough end wall 4 and the distance between the ends of the conduit support member 20. The parabolic trough 2 may have a trough depth 11 (FIG. 5) which corresponds to the distance between the bottom center of the light reflective surface 16 on the trough panel 12 and the conduit support surfaces 5 on the respective trough end walls 4 and the conduit support surface 23 on the conduit support member 20. In some embodiments, the optimal ratio of the trough width 10 to the trough depth 11 may be about 4:1. This optimal trough width:trough depth ratio may facilitate concentration of the reflected solar rays 52 at an optimal solar energy focal point 60 on the absorber 48 to facilitate efficient heating of the fluid 54 as the absorber 48 lies in place on the parabolic trough 2. Thus, in embodiments in which the trough width 10 is 16 inches, the trough depth 11 is 4 inches and corresponds to the solar energy focal point 60 on the absorber 48. In embodiments in which the trough width 10 is 8 inches, the trough depth 11 is 2 inches and corresponds to the solar energy focal point 60 on the absorber 48.

Figure 9:
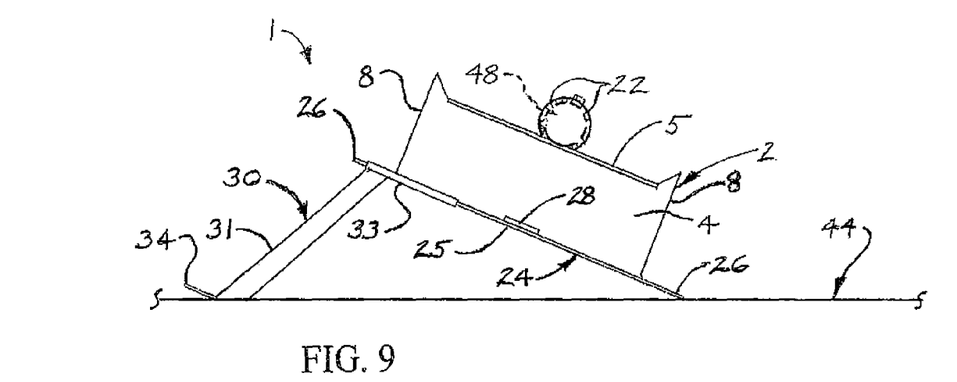
FIG. 9 is an end view of an illustrative embodiment of the parabolic trough modules, with a pair of module legs (one of which is illustrated) installed on one side only of the module to impart a slant to the parabolic trough module along its transverse axis according to some applications.
Figure 10:
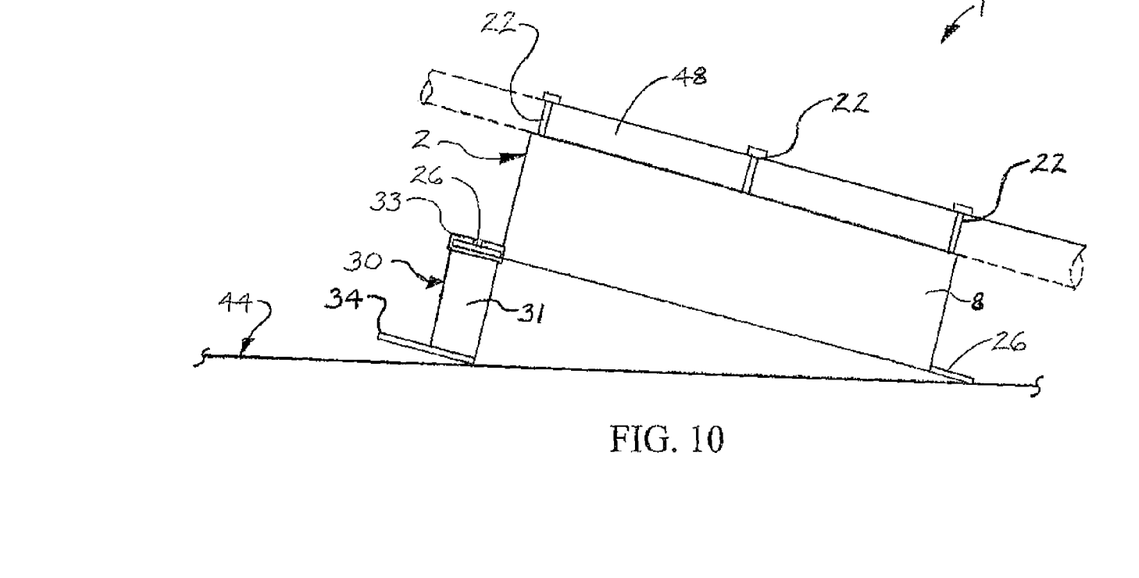
FIG. 10 is a side view of an illustrative embodiment of the parabolic trough modules, with a pair of removable module legs (one of which is illustrated) installed on one end only of the module to impart a slant to the parabolic trough module along its longitudinal axis according to some applications.

As further illustrated in FIG. 7, in some applications, each parabolic trough module 1 can be anchored on the roof 44 by inserting the anchor tabs 26 of each module anchor flange 24 beneath one of the shingles 45 to anchor or stabilize the parabolic trough modules 1 and the absorber 48 on the roof 44. In other applications, a pair of module legs 30 can be attached to each module anchor flange 24 to support the parabolic trough module 1 in an elevated position on the roof 44 or other structure or surface. Accordingly, each parabolic trough module 1 can be anchored on the roof 44 by inserting the foot 34 of each module leg 30 beneath one of the shingles 45 to stabilize the parabolic trough modules 1 and the absorber 48 on the roof 44. As illustrated in FIG. 9, in some applications, a pair of module legs 30 (one of which is illustrated) may be installed on one side only of the parabolic trough 2 to impart a slant to the parabolic trough module 1 along its transverse axis. As illustrated in FIG. 10, in other applications, a pair of module legs 30 (one of which is illustrated) may be installed on one end only of the parabolic trough 2 to impart a slant to the parabolic trough module along its longitudinal axis. Thus, the fluid 54 (FIG. 7) may include a liquid which flows through the absorber 48 by gravity down the slope of the absorber 48. By selective placement of the module legs 30 on one side or one end of the parabolic trough 2, the pitch or angle of the parabolic trough module 1 can be selected to match the seasonal solar angle of the sun and facilitate optimal heating of the fluid 54 as it flows through the absorber 48.

It will be appreciated by those skilled in the art that the parabolic trough modules 1 may provide a low-cost solar concentrator of solar energy for home and/or educational use. The parabolic trough modules 1 may be fabricated of corrosion-resistant aluminum which can be used singularly, or multiple parabolic trough modules 1 may be arranged in series configuration, as was heretofore described with respect to FIG. 7. In some embodiments, the aluminum sheet metal of the trough panel 12 may be formed into a solar sunlight collector concentrator by the removal of oxidation from the light reflective surface 16 and then buffing, cleaning, and seal coating of the light reflective surface 16 with non-yellowing exterior grade clear acrylic enamel paint sealer. The typically reflective aluminum concentrator may form a semicircular segment which concentrates and directs solar energy to the linear solar energy focus point 60 (FIG. 8) on the absorber 48 for collection of heat when installed on the trough end walls 4 and the conduit support member 20. Moreover, the parabolic trough module 1 may be installed or deployed in a pitched, angled or sloped configuration along the longitudinal axis or the transverse axis by selective deployment of the module legs 30, as was described above.

It will further be appreciated by those skilled in the art that the trough width:trough depth ratio of 4:1 in some embodiments of the parabolic trough modules 1 may facilitate optimal positioning of the solar energy focal point 60 on the absorber 48 when the absorber 48 is deployed in place on the parabolic trough 2. The optimal positioning of the solar energy focal point 60 on the absorber 48 facilitates effective and efficient heating of the fluid 54 (FIG. 7) flowing through the absorber 48 without subjecting the absorber 48 to excessive heat. It has been found that positioning of the solar energy focal point 60 on the absorber 48 using a trough width:trough depth ratio of 4:1 heats and maintains the absorber 48 to a temperature of about 150-200 degrees F., as compared to some conventional parabolic heating troughs, in which the conduit may reach temperatures as high as 400 degrees F. Consequently, the parabolic trough module 1 may utilize absorbers 48 which are relatively inexpensive material while effectively, efficiently and uniformly heating the fluid 54 as it flows through the absorber 48.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A parabolic trough module, comprising:
   a generally elongated parabolic trough including:
   a pair of spaced-apart trough end walls each having a conduit support surface and a lower end wall edge generally parallel to and opposite the conduit support surface; and
   a trough panel extending between the trough end walls, the trough panel generally semi-circular in cross-section and having a concave light reflective surface; and
   wherein each of the trough end walls includes a generally elongated, planar module anchor flange having a middle flange portion extending along the lower end wall edge of each corresponding one of the trough end walls and a pair of anchor tabs extending from the middle flange portion beyond respective sides of each corresponding one of each of the trough end walls, the module anchor flange having a plane disposed in generally perpendicular relationship to a plane of each corresponding trough end wall, and at least one reflector on the middle flange portion of the module anchor flange.

2. The parabolic trough module of claim 1 further comprising at least one conduit securing device on each of the trough end walls.

3. The parabolic trough module of claim 1 further comprising at least one pair of spaced-apart trough legs on the parabolic trough.

4. The parabolic trough module of claim 1 further comprising at least one conduit support member on the trough panel substantially midway between the trough end walls.

5. The parabolic trough module of claim 4 further comprising at least one conduit securing device on the at least one conduit support member.

6. The parabolic trough module of claim 1 wherein the trough panel has a trough width:trough depth ratio of about 4:1.

7. A parabolic trough module, comprising:
   a generally elongated parabolic trough including:
   a pair of spaced-apart trough end walls each having a conduit support surface and a lower end wall edge generally parallel to and opposite the conduit support surface; and
   a trough panel extending between the trough end walls, the trough panel having a concave light reflective surface, a cross-sectional radial curvature of less than about 180 degrees and a trough width:trough depth ratio of about 4:1; and
   wherein each of the trough end walls includes a generally elongated, planar module anchor flange having a middle flange portion extending along the lower end wall edge of each corresponding one of the trough end walls and a pair of anchor tabs extending from the middle flange portion beyond respective sides of each corresponding one of each of the trough end walls, the module anchor flange having a plane disposed in generally perpendicular relationship to a plane of each corresponding trough end wall, and at least one reflector on the middle flange portion of the middle anchor flange.

8. The parabolic trough module of claim 7 further comprising at least one pair of spaced-apart trough legs on the parabolic trough.

9. The parabolic trough module of claim 7 further comprising at least one conduit support member on the trough panel substantially midway between the trough end walls.

10. The parabolic trough module of claim 9 further comprising at least one conduit securing device on the at least one conduit support member.

11. The parabolic trough module of claim 7 further comprising at least one conduit securing device on each of the trough end walls.

12. A parabolic trough module, comprising:
    a generally elongated parabolic trough including:
    a pair of spaced-apart trough end walls;
    at least one conduit securing device on each of the trough end walls; and
    a trough panel extending between the trough end walls, the trough panel having a concave light reflective surface;
    each of the trough end walls includes a generally elongated module anchor flange having a middle flange portion extending from each corresponding one of the trough end walls and a pair of anchor tabs extending from the middle flange portion beyond respective sides of each corresponding one of each of the trough end walls; and
    a pair of module legs detachably attached to each corresponding pair of the anchor tabs, respectively, each of the pair of module legs including:
    an insertion segment detachably engaging a corresponding one of the pair of anchor tabs;
    a main leg segment extending from the insertion segment in generally perpendicular relationship to the insertion segment; and
    a foot extending from the main leg segment in generally perpendicular relationship to the main leg segment.

13. The parabolic trough module of claim 12 wherein the trough panel has a cross-sectional radial curvature of less than about 180 degrees.

14. The parabolic trough module of claim 13 wherein the trough panel has a trough width:trough depth ratio of about 4:1.

15. The parabolic trough module of claim 12 further comprising a conduit support member on the trough panel substantially midway between the trough end walls and at least one conduit securing device on the conduit support member.

16. The parabolic trough module of claim 12 further comprising at least one reflector on the middle flange portion of the module anchor flange.

* * * * *